(12) United States Patent
Schwarz et al.

(10) Patent No.: US 7,341,426 B2
(45) Date of Patent: Mar. 11, 2008

(54) GAS TURBINE ENGINE BLADE TIP CLEARANCE APPARATUS AND METHOD

(75) Inventors: Frederick M. Schwarz, Glastonbury, CT (US); Robert H. Perkinson, Somers, CT (US); Jesse Walter Smith, Seneca, SC (US)

(73) Assignee: United Technologies Corporation, Hartford, CT (US)

( * ) Notice: Subject to any disclaimer, the term of this patent is extended or adjusted under 35 U.S.C. 154(b) by 111 days.

(21) Appl. No.: 11/025,435

(22) Filed: Dec. 29, 2004

(65) Prior Publication Data

US 2006/0140755 A1    Jun. 29, 2006

(51) Int. Cl.
*F01D 11/08* (2006.01)

(52) U.S. Cl. ............... 415/173.2; 415/173.4; 415/127

(58) Field of Classification Search ............ 415/173.2, 415/173.4, 127, 138
See application file for complete search history.

(56) References Cited

U.S. PATENT DOCUMENTS

| | | | | |
|---|---|---|---|---|
| 2,762,559 A | * | 9/1956 | Faught | ............... 415/17 |
| 4,149,826 A | * | 4/1979 | Torstenfelt | ............... 415/127 |
| 4,330,234 A | * | 5/1982 | Colley | ............... 415/173.2 |
| 4,343,592 A | * | 8/1982 | May | ............... 415/173.2 |
| 5,228,828 A | * | 7/1993 | Damlis et al. | ............... 415/173.2 |
| 5,330,320 A | * | 7/1994 | Mansson | ............... 415/129 |
| 6,652,226 B2 | * | 11/2003 | Albrecht et al. | ............... 415/173.4 |

* cited by examiner

*Primary Examiner*—Hoang Nguyen
(74) *Attorney, Agent, or Firm*—Bachman & LaPointe, P.C.

(57) ABSTRACT

A gas turbine engine is provided that includes one or more rotor assemblies, one or more shroud segments, and an actuator. The rotor assemblies are rotatable around an axially extending rotational axis, and each rotor assembly has a plurality of blades. Each blade has a blade tip. The one or more shroud segments each has a blade seal surface disposed radially outside of the one or more rotor assemblies. The blade tips and blade seal surfaces (collectively referred to as the blade seal surface) have mating conical geometries and a clearance distance extending between the blade tips and blade seal surface. The blade tips and blade seal surface are disposed at an angle relative to the axial centerline of the engine, which angle is greater than zero. The actuator is selectively operable to axially move one or both of the shroud segments and rotor assemblies relative to the other of the shroud segments and rotor assemblies to alter the clearance distance.

19 Claims, 4 Drawing Sheets

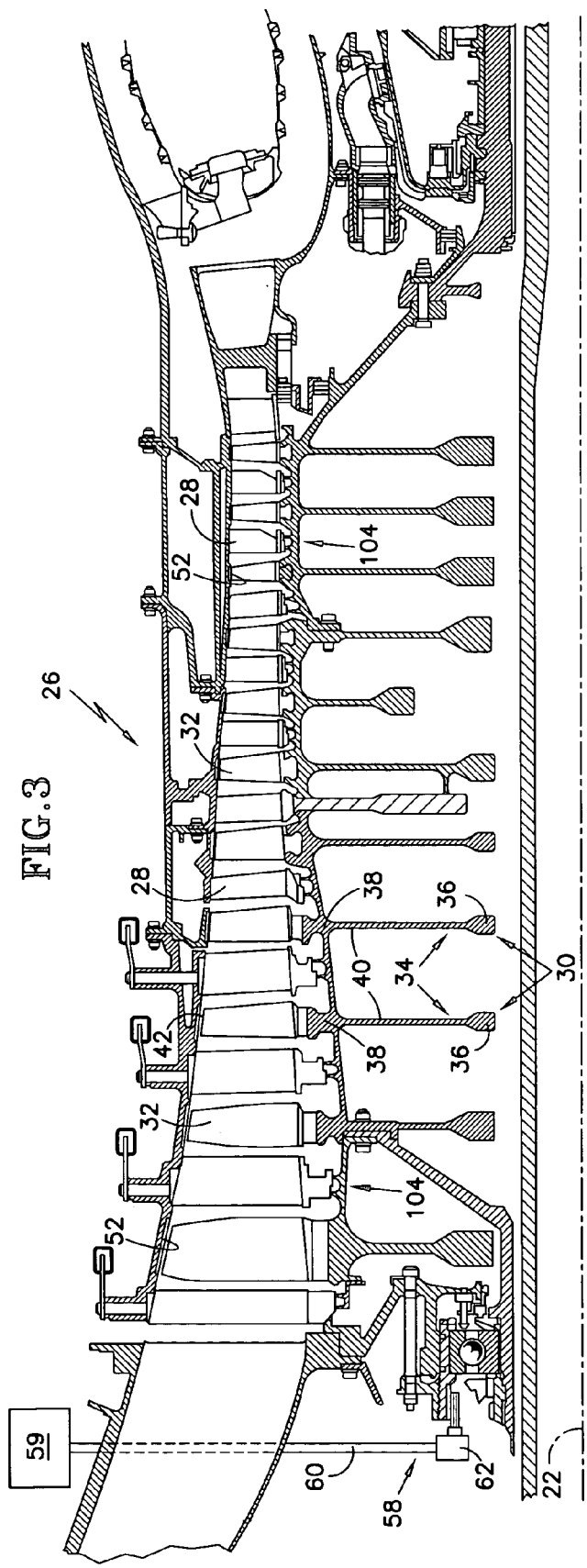

GAS TURBINE ENGINE BLADE TIP CLEARANCE APPARATUS AND METHOD

BACKGROUND OF THE INVENTION

1. Technical Field

The present invention relates to gas turbine engines in general, and to blade tip clearance therein in particular.

2. Background Information

In an axial flow gas turbine engine, air is compressed in a compressor section, mixed with fuel and combusted in a combustor section, and expanded through a turbine section that, via one or more shafts, drives the compressor section. The overall efficiency of such engines is a function of, among other factors, the efficiency with which the compressor section compresses the air. The compressor section typically includes a low pressure compressor driven by a shaft connected to a low pressure turbine in the turbine section, and a high pressure compressor driven by a shaft connected to a high pressure turbine in the turbine section. The high and low compressors are multi-stage, wherein the air flows in the axial direction through a series of rotors and stators that are concentric with the axis of rotation (longitudinal axis).

The stages are arranged in series. Each stage compresses the air passing through the engine and thereby incrementally increases the pressure of the air. The total pressure increase through the compressor is the sum of the incremental pressure increases through each stage, adjusted for any flow losses. Thus, in order to maximize the efficiency of the gas turbine engine, it would be desirable, at a given fuel flow, to maximize the pressure rise (hereinafter referred to as "pressure ratio") across each stage of the compressor.

For a variety of reasons, including efficiency, it is highly desirable to minimize the clearance between the blade tips of a rotor and the casing surrounding the rotor. Prior art solutions to maintaining blade tip clearance include the use of abradables and active clearance control systems that manipulate the radial position of the casing surrounding the rotor. A problem with an abradable system is that it is not adjustable once the seal is abraded. Once set, the clearance depends solely on the thermal and centrifugal response of the rotor and the casing. A problem with prior art active clearance systems is their response time. Prior art active clearance systems often utilize the flow (or lack of flow) of cooling air as a mechanism to move the casing via thermal expansion or contraction and thereby achieve the desired clearance. Such systems are still subject to the casing s thermal response time, and the mismatch of the casing s thermal response to the rotor disc s thermal response.

FIG. 1 is a diagrammatic graph of blade tip clearance versus response time typical of a prior art gas turbine engine. At position A, the engine is running at a steady-state idle condition (i.e., low rpm s, low core gas temperature). At position B, the engine is sharply accelerated (e.g., acceleration for takeoff). As a result of the acceleration, the blade tip clearance decreases dramatically, reaching a minimum clearance at position C. At this point, the change in clearance is almost entirely attributable to mechanical growth of the rotor assembly as a result of the centrifugal loading on the rotor assembly and the thermal growth of the blade.

The increase in core gas temperature that accompanies the acceleration next causes thermal radial growth of the casing surrounding the rotor assembly (from position C to position D). The decrease in clearance between positions D and E is attributable to the eventual thermal growth of the rotor disk. The greater mass of the rotor assembly, in particular the rotor disk, causes it to have a slower thermal response than that of the casing. The eventual stabilized clearance at position E is a function of the final temperatures of the disc, blades, casing, the centrifugal pull, and the coefficient of thermal expansion of each part of the rotor assembly and casing.

The significant increase in clearance between positions E and F is a result of a deceleration. The deceleration causes a decrease in the centrifugal loading on the rotor assembly and rapid cooling of the blades, which results in a decrease in the mechanical growth of the rotor assembly. Under normal conditions, the clearance will decrease in the manner suggested by the line extending between positions F and I. Here again, however, the clearance will depend on the thermal responses of the disc and the casing.

If, however, a sharp acceleration is performed between positions G and H, the clearance in a prior art compressor will decrease significantly. The decrease in clearance results from the combination of: 1) the almost immediate mechanical growth of the rotor assembly; 2) the already decreased casing inner radial dimension as a result of the casing s relatively immediate thermal response rate following the deceleration; and 3) the lack of decrease in rotor assembly attributable to the rotor s relatively slow thermal response. With respect to the latter two factors, the difference in thermal response between the casing and the rotor assembly creates a situation where the casing has already substantially returned to its pre-thermal growth dimension, but the rotor assembly has not yet returned to its pre-thermal growth dimension. The resultant rub-out of the seal is shown at position H. In prior art gas turbine engines, the clearance at position H is often chosen as the worst-case clearance and blade tip clearance is designed to accommodate the operating scenario present at position H. As a result, the blade tip/casing clearances are minimum at position H, but less than optimum under normal operating conditions (e.g., positions A-G).

Thus, what is needed is an improved apparatus and method for maintaining a desired blade tip clearance throughout transient and steady-state operation of the gas turbine engine.

SUMMARY OF THE INVENTION

According to the present invention, a gas turbine engine compressor is provided that includes one or more rotor assemblies, one or more shroud segments, and an actuator. The rotor assemblies are rotatable around an axially extending rotational axis, and each rotor assembly has a plurality of blades. Each blade has a blade tip. The one or more shroud segments each has a blade seal surface disposed radially outside of the one or more rotor assemblies. The blade tips and blade seal surfaces (collectively referred to as the blade seal surface) have mating conical geometries and a clearance distance extending between the blade tips and blade seal surface. The blade tips and blade seal surface are disposed at an angle relative to the axial centerline of the compressor, which angle is greater than zero. The actuator is selectively operable to axially move one or both of the shroud segments and rotor assemblies relative to the other of the shroud segments and rotor assemblies to alter the axial position to affect the radial clearance distance.

An advantage of the present invention is that it provides a mechanism to increase the efficiency of the gas turbine engine. The efficiency gains are possible because of the speed at which adjustment of the clearance between rotor blade tips and the blade seal surface can be accomplished. The actuator axially moves one or both of the shroud segments or the rotor assembly(ies) in a fraction of the time it would take a system that adjusts via thermal expansion or contraction of one or more components. As a result, the minimum design clearance between the blade tips and shroud blade seal surfaces is less for an engine using the present invention than it would be for an engine using a blade clearance system reliant upon thermal expansion or contraction.

Another advantage of the present invention is that it permits the clearance between the blade tips and the shroud blade seal surfaces to be selectively adjusted during operation.

Another advantage of the present invention is that it permits the clearance between the blade tips and the shroud blade seal surfaces to be selectively adjusted to accommodate for wear.

Another advantage of the present invention is that it permits the clearance within knife-edge and abradable pad seal pairs to be selectively adjusted during operation.

These and other objects, features and advantages of the present invention will become apparent in light of the detailed description of the best mode embodiment thereof, as illustrated in the accompanying drawings.

BRIEF DESCRIPTION OF THE DRAWINGS

FIG. 3 is a diagrammatic view of a high-pressure compressor having a plurality of stages.

FIG. 4 is a diagrammatic view of a blade tip and a shroud sealing surface.

FIG. 5 is a diagrammatic view of a knife-edge seal having a knife-edge portion and an abradable pad.

DETAILED DESCRIPTION OF THE INVENTION

Figure 1:
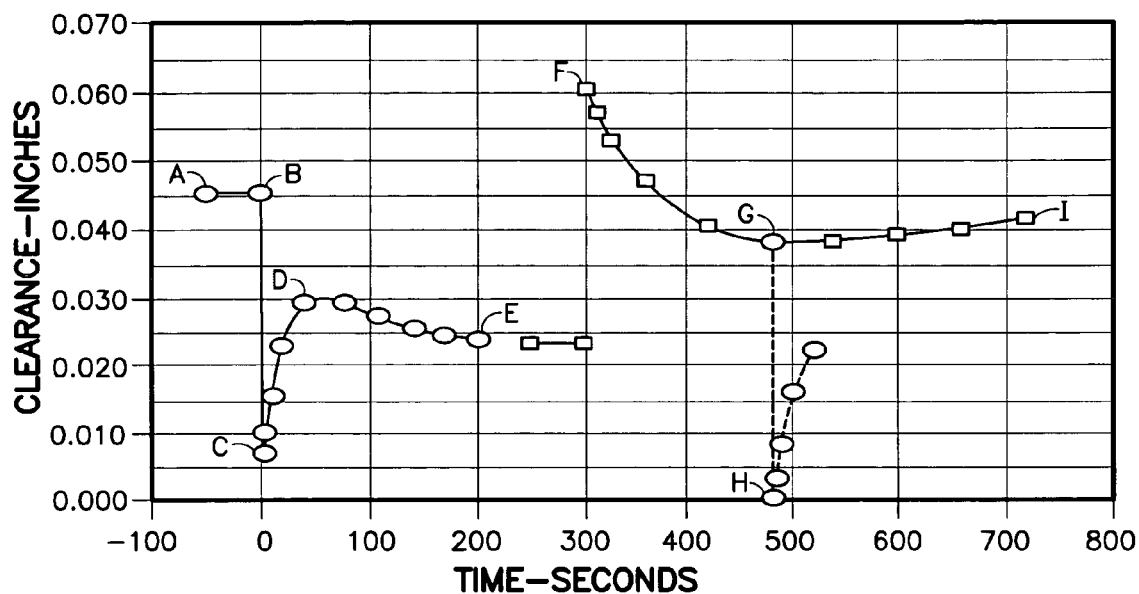
FIG. 1 is a graph depicting blade tip/shroud clearance as a function of time for a typical prior art engine.
Figure 2:
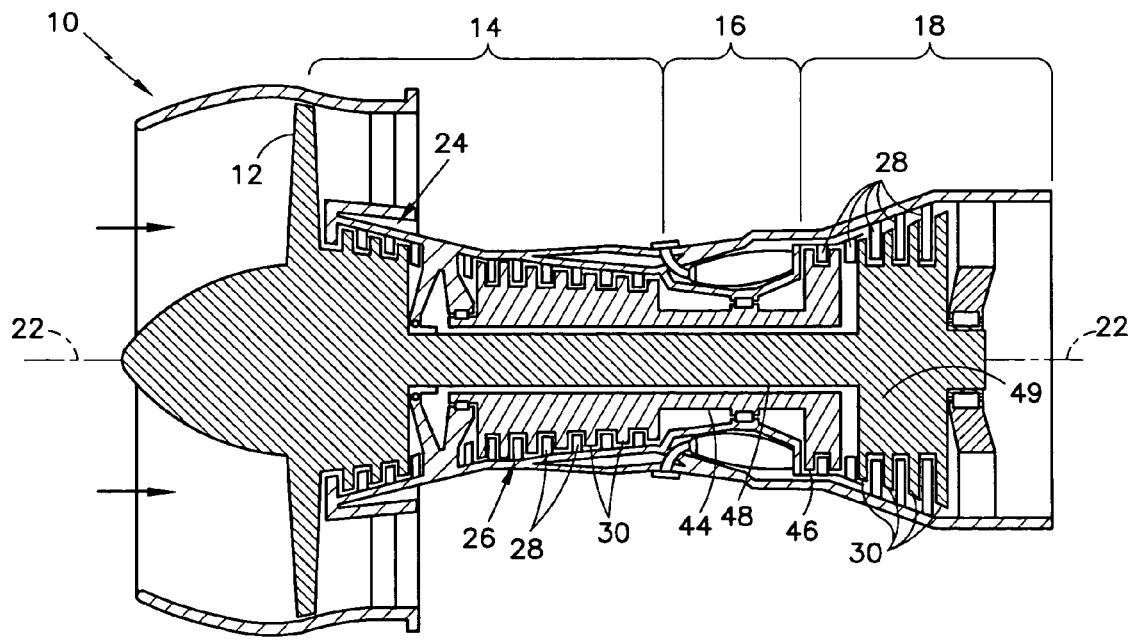
FIG. 2 is a diagrammatic sectional of a gas turbine engine.

Referring to FIGS. 2 and 3, a gas turbine engine 10 is diagrammatically shown that includes a fan section 12, a compressor section 14, a combustor section 16, and a turbine section 18. The engine 10 has an axially extending centerline 22. Ambient air enters the engine 10 through the fan section 12. The majority of that air subsequently travels through the compressor, combustor, and turbine sections 14, 16, 18 as core gas flow before exiting through a nozzle.

The compressor 14 may be a single unit or may be sectioned into a low-pressure compressor 24 and a high-pressure compressor 26. Both the low-pressure compressor 24 and the high-pressure compressor 26 (or the single compressor embodiment) include a plurality of stator assemblies 28 and rotor assemblies 30. The stator assemblies 28 include a plurality of segments, each having one or more stator vanes disposed between an inner platform and an outer platform. The segments of each stator assembly 28 collectively form an annular structure that is disposed adjacent a rotor assembly 30.

Each rotor assembly 30 includes a plurality of blades 32 and a disk 34 rotatable around the axially extending centerline 22 of the engine 10. The disk 34 includes a hub 36, a rim 38, and a web 40 extending there between. The blades 32 are attached to and extend radially out from the rim 38. Each blade 32 includes a tip 42 that is disposed at a tip angle relative to the axial centerline 22 that is greater than zero (i.e., the blade tip angle is not parallel with the axial centerline 22). The blade tip angle for each blade 32 in a particular rotor assembly 30 is the same for each blade 32 within that rotor assembly 30. Different rotor assemblies 30 may, however, have different blade tip angles. The rotor assemblies 30 within the low-pressure compressor 24 are mechanically attached to one another and therefore rotate together. The rotor assemblies 30 within the high-pressure compressor 26 are mechanically attached to one another and therefore rotate together.

A shaft connects the compressor 14 to the turbine 18. In those embodiments that include a low-pressure compressor 24 and a high-pressure compressor 26, the high-pressure compressor 26 is connected by a first shaft 44 ("HP shaft") to a high-pressure turbine section 46 and the low-pressure compressor 24 is connected by a second shaft 48 ("LP shaft") to a low-pressure turbine section 49.

Referring to FIGS. 3 and 4, a circumferentially extending shroud 52 is disposed radially outside of each rotor assembly. Each shroud 52 may consist of a single segment or of multiple segments. The shroud 52 includes a blade seal surface 54 that is radially aligned with the blade tips 42 of the rotor assembly 30. The blade seal surface 54 is disposed at substantially the same angle as the blade tip angle of the rotor assembly 30; i.e., both the blade tip angle and the shroud blade seal surface angle are substantially equal and both are at an angle relative to the axial centerline 22 that is greater than zero. The configuration of the rotor blade tips 42 disposed radially inside of the shroud blade seal surfaces 54, both of which are at an angle relative to the axial centerline 22 that is greater than zero, may be referred to as mating conical geometries. The distance 56 extending between the blade tips 42 and the blade seal surface 54 is referred to as the clearance distance 56 between the rotor assembly 30 and the shroud 52.

The rotor assemblies 30 of the compressor 14 are attached to an actuator 58 that is selectively operable to axially move one or both of the shroud 52 segments and rotor assemblies 30 relative to the other of the shroud 52 segments and rotor assemblies 30. The relative movement of the one or both of the shroud 52 segments and rotor assemblies 30 relative to the other of the shroud 52 segments and rotor assemblies 30 alters the clearance distance 56 between the blade tips 42 and the blade seal surface 54 for each stage of the compressor 14, or the portion 24, 26 of the compressor 14 in which the rotor assemblies 30 are located.

Figure 6:
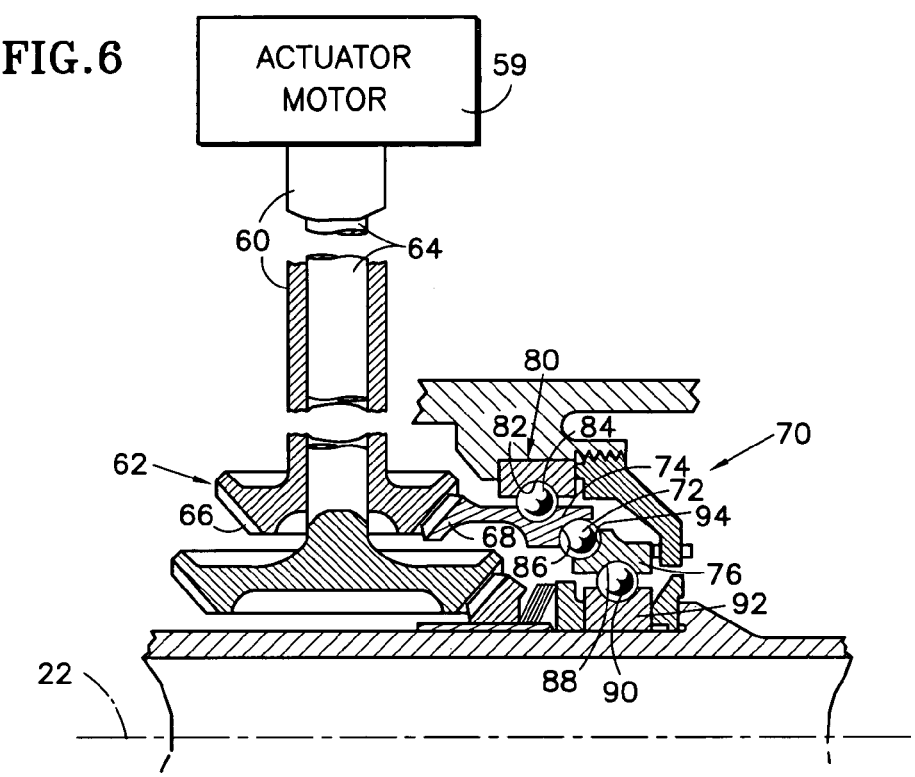
FIG. 6 is a diagrammatic view of a motor, tower shaft, gear arrangement and actuator embodiment.

In the embodiment shown in FIGS. 3 and 6, the actuator 58 includes a motor 59 (e.g., a hydraulic motor shown diagrammatically) connected to a tower shaft 60 (hereinafter referred to as the "clearance drive" tower shaft 60) disposed approximately perpendicular to the axial centerline 22 of the engine 10. The clearance drive tower shaft 60 enables movement of one of the low-pressure compressor 24 or the high-pressure compressor 26 relative to the shroud 52. For illustration purposes, FIG. 3 shows the actuator 58 operably connected to the high-pressure compressor 26. In alternative embodiments, the actuator 58 could be connected to the low-pressure compressor 24, or the high-pressure and low-pressure compressors 24, 26 could each be connected to independent actuators 58. One end of the clearance drive tower shaft 60 is operably connected to the motor 59. The other end of the clearance drive tower shaft 60 is connected to a gear arrangement 62. FIG. 6 shows the HPC clearance drive tower shaft 60 concentrically arranged with an accessory drive shaft 64. Other tower shaft arrangements may be used alternatively. The gear arrangement 62 is connected to the rotor assembly(ies) 30 by a mechanism that converts rotational movement to linear movement. Screw thread devices, for example, can be used to create the desired linear movement. Examples of screw thread devices are provided below. The present invention is not, however, limited to devices that use rotational and linear movement. Linear actuators can be used in some applications.

Figure 7:
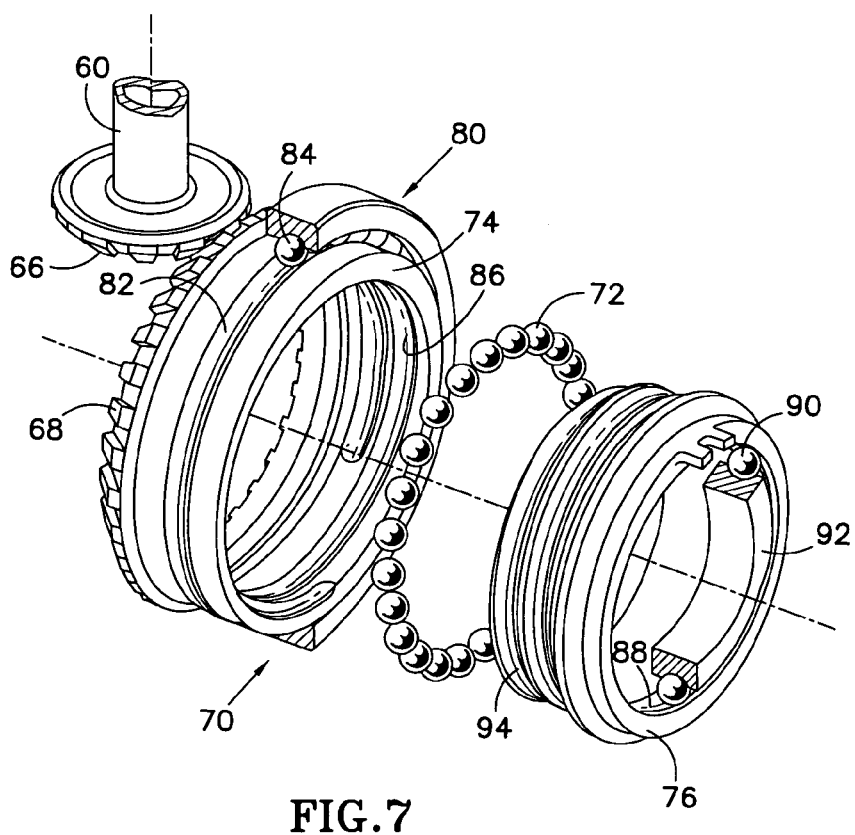
FIG. 7 is an exploded view of a ball screw actuator similar to the one depicted in FIG. 6.

In the embodiment shown in FIGS. 6 and 7, the gear arrangement 62 includes a first bevel gear 66 attached to the clearance drive tower shaft 60, and a second bevel gear 68 attached to a ball screw type actuator 70, which is a type of screw thread device. The ball screw actuator 70 is connected to the rotor assemblies 30 of the high-pressure compressor 26. Specifically, the ball screw actuator 70 includes a plurality of ball bearings 72 disposed between a first member 74 and a second member 76. The first member 74 is attached to the second bevel gear 68 and is mounted relative to the casing 78, including the shrouds 52, via a casing bearing 80. The first member 74 includes an outer diameter circumferential groove 82 for receiving the ball bearings 84 of the casing bearing 80, and an inner diameter helical groove 86 for receiving the ball bearings 72 of the ball screw actuator 70. In a similar manner, the second member 76 of the ball screw actuator 70 includes an inner diameter circumferential groove 88 for receiving the ball bearings 90 of a shaft bearing 92, and an outer diameter helical groove 94 for receiving the ball bearings 72 of the ball screw actuator 70. When the ball screw actuator 70 is assembled, the helical grooves 86, 94 of the first member 74 and second member 76 face one another and collectively provide the helical pathway for the ball screw actuator ball bearings 72. Rotation of the first member 74 of the ball screw actuator 70 causes the second member 76 of the ball screw actuator 70 (non-rotationally attached to the rotor assembly(ies) 30) to travel axially relative to the first member 74. As a result, the rotor assemblies 30 of the high-pressure compressor 26 attached to the second member 76 travel axially as well.

Figure 8:
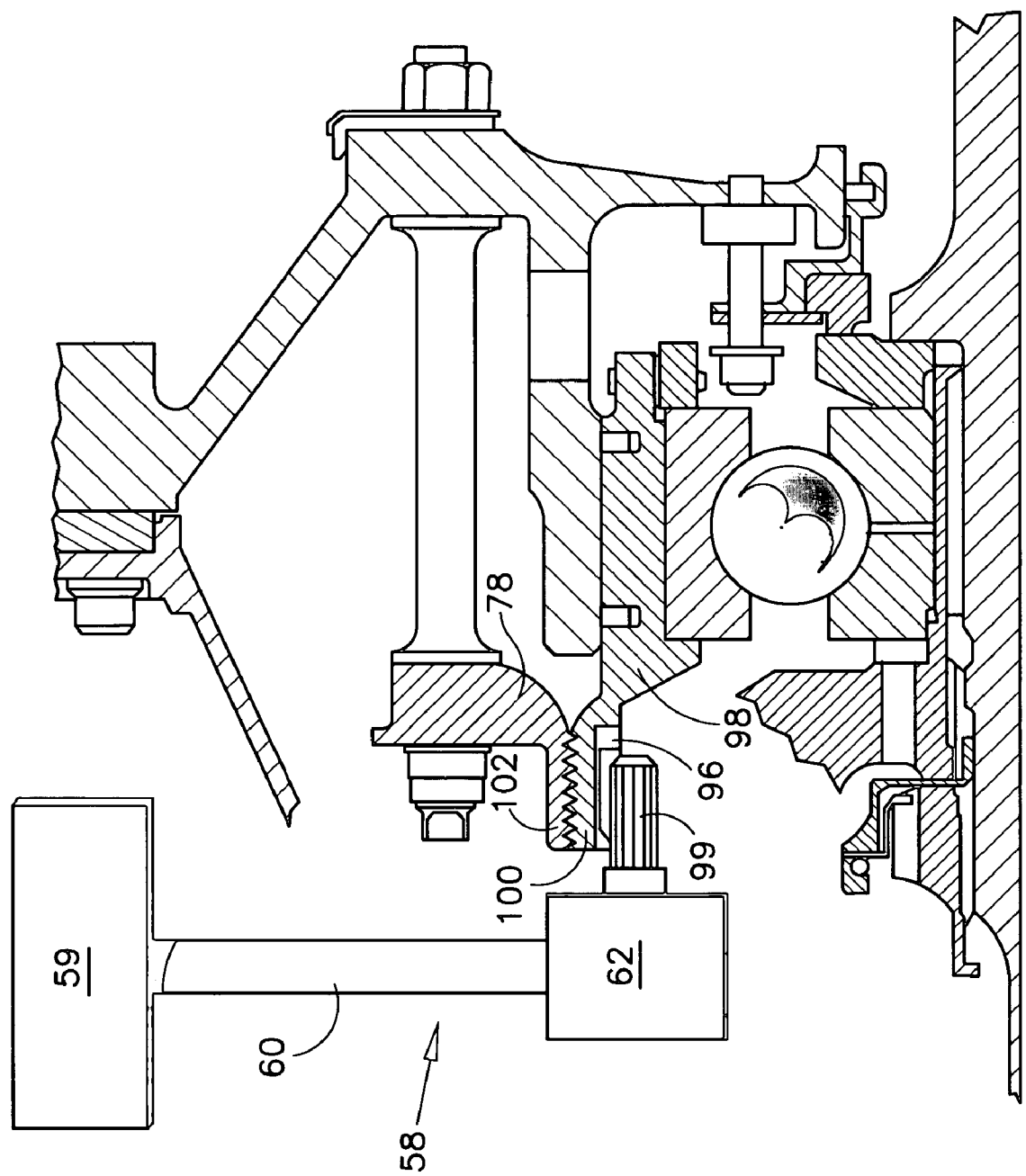
FIG. 8 is a diagrammatic view of a motor, tower shaft, gear arrangement and actuator embodiment.

In alternative embodiments, the actuator 58 includes the motor 59 (e.g., a hydraulic motor) and a tower shaft 62 arrangement similar to that described above. In the alternative embodiments, however, the gear arrangement 62 engaged with the tower shaft 62 can include a variety of different gear combinations and/or types of gears; e.g., combinations of bevel gears and spur gears, shafts, etc. The embodiment shown in FIGS. 3 and 8, for example, includes a spur gear 96 attached to a bearing mount 98. The gear arrangement 62 includes a gear 99 for engaging the spur gear 96 attached to the bearing mount 98. The bearing mount 98 also has a screw thread portion 100 that mates with a screw thread portion 102 of the casing 78. Rotation of the tower shaft 62 via the motor 59, causes the bearing mount 98 to rotate relative to the casing 78. The screw thread engagement between the casing 78 and the bearing mount 98 causes the rotating bearing mount 98 to travel axially. As a result, the shaft bearing 92 and attached rotor assemblies 30 of the high-pressure compressor 26 travel axially as well.

The above-described actuator 58, gear arrangement 62, and motor combinations are examples of how the axial movement of one or more rotor assemblies 30 can be accomplished. The present invention is not limited to these examples.

Referring to FIGS. 3 and 5, many gas turbine engines 10 utilize knife-edge seal arrangements 104 to seal between rotor assemblies 30 and stator assemblies 28, outside of the core gas path. The knife-edge seal arrangements 104 typically comprise a knife-edge portion 106 attached to a flange extending out from the web 40 or rim 38 of a rotor assembly disc 34. An abradable pad 108 is disposed opposite the knife-edge portion(s) 106, attached to the stator assembly 28. In prior art applications, the knife-edge portion 106 is permitted to abrade a channel within the abradable pad 108 during operation of the engine 10. The channel is radially aligned with the knife-edge portion 106. The depth of the channel is dictated by the largest radial incursion of the knife-edge 106 into the abradable pad 108. Once the maximum depth of the channel is established, any radial position less than the aforesaid largest incursion, such as would be the case for partial power operation, will permit leakage of air between the knife-edge portion 106 and the abradable pad 108.

The present invention permits the use of knife-edge seal arrangements 104 to seal between rotor assemblies 30 and stator assemblies 28, outside of the core gas path. Under the present invention, however, the seal between the knife-edge portion 106 and the abradable pad 108 is not dictated by the largest radial incursion of the knife-edge portion 106 into the abradable pad 108. Instead, the present invention utilizes an abradable pad 108 having a preformed channel 110 that is contoured to accommodate the position of the knife-edge portion 106. FIG. 5 shows an abradable pad 108 with a channel 110 having a predetermined shape. The channel 110 shape causes the radial gap between the knife-edge portion 106 and the abradable pad 108 to change based on the relative axial positions of the knife-edge portion 106 and the abradable pad 108. Optimum channel 110 geometry can be determined by analysis for a given application. For example, a first radial gap can be provided adjacent one side of the channel 110 and a second radial gap at the opposite side of the channel 110 to accommodate different operating conditions. A variety of channel 110 geometries are possible to accommodate various operating conditions, and the present invention seal arrangement is not limited to any particular channel 110 geometry.

Referring to FIG. 4, in some embodiments of the present invention, a sensor arrangement 116 can be used to actively control blade tip clearance. For example, it is known to use microwave sensors to determine the clearance gap between rotor blade tips 42 and a shroud 52. Under the present invention, as will be described below, the clearance gap between the blade tips 42 of a rotor assembly 30 and the blade seal surface 54 of the shroud 52 can be modified based on the information determined using the sensors.

In the operation of the present invention, the rotor assemblies 30 of the high-pressure compressor 26 are positioned at an initial axial position that provides a desired blade tip 42/shroud 52 clearance. Almost immediately after the operating condition of the gas turbine engine 10 changes from the first operating condition (e.g., steady-state idle) to a second operating condition (e.g., takeoff acceleration) the clearances between the rotor blade tips 42 and the shroud 52 will begin to change. The change will continue until the engine 10 reaches steady state at the new operating condition. The amount of time required for the complete clearance change to occur will depend upon the specifics of the gas turbine engine 10 at hand, and the magnitude of the change between the first and second operating conditions.

To respond to the change in clearance between the rotor blade tips 42 and the shroud 52, the present invention blade tip clearance apparatus is actuated to move one or both of the shroud 52 or the rotor assembly relative to the other. In the example provided above, the rotor assemblies 30 of the high-pressure compressor 26 are moved relative to the blade seal surfaces 54 of the shroud 52 to either increase or decrease the clearance distance 56.

An advantage of the present invention blade tip clearance apparatus is the speed at which the blade tip clearance distance 56 can be changed. The present invention apparatus does not utilize cooling air to thermally expand (or contract) elements to create a desired clearance condition. Thermal expansion/contraction is a relatively slow process. The present invention apparatus, in contrast, utilizes a mechanical actuator 58 to move one of the shroud 52 or the rotor assembly 30 relative to the other. Hence, the speed at which blade tip clearance change can be accomplished is limited by the operating speed of the actuator 58.

In those embodiments where sensors 116 are used to sense blade tip to shroud 52 clearance, the sensor signals can be used as input data to control the actuator 58 of the present invention apparatus. The rate at which sensor data is acquired can be varied to suit the application at hand. For example, sensor data can be acquired at set intervals and that data can then be used to adjust the clearance as necessary. Alternatively, the sensors 116 can be activated upon the occurrence of certain events, or some combination of an event trigger and periodic acquisition. In all cases, once the sensor data is collected it can be used to as an input for the purpose of adjusting the blade tip/shroud clearance 56 as necessary.

For example, a desired blade tip/shroud clearance distance 56 with respect to a given set of operating conditions can be compared against a sensed actual clearance value to determine the difference there between. If the difference is outside of a predetermined acceptable range, then the actuator 58 can be selectively operated to axially move one of the shroud 52 or rotor assembly(ies) 30 relative to the other to decrease the blade tip clearance distance 56 to within the acceptable range.

Alternatively, a series of engine tests could be run with instrumentation to determine the axial and radial clearance characteristics of the engine. The data collected would provide the basis for a control algorithm for the actuator.

Although this invention has been shown and described with respect to the detailed embodiments thereof, it will be understood by those skilled in the art that various changes in form and detail thereof may be made without departing from the spirit and the scope of the invention. For example, the present invention has been described as a method and apparatus for controlling blade tip clearance within the compressor section of a gas turbine engine 10. The present invention could also be used to control the blade tip clearance within the turbine section of a gas turbine engine 10.

What is claimed is:

1. A gas turbine engine compressor, comprising:
one or more rotor assemblies rotatable around an axially extending rotational axis, each rotor assembly having a plurality of blades with each blade having a blade tip;
one or more shroud segments having blade seal surfaces disposed radially outside of the one or more rotor assemblies;
wherein the blade tips and blade seal surfaces have mating conical geometries and a clearance distance extending between the blade tips and blade seal surfaces; and
an actuator selectively operable to axially move one or both of the shroud segments and rotor assemblies relative to the other of the shroud segments and rotor assemblies to alter the clearance distance,
wherein the actuator includes a screw thread device disposed in connection with the one or more rotor assemblies,
wherein one or both of the shroud segments and rotor assemblies move axially relative to the other of the shroud segments and rotor assemblies when at least a portion of the screw thread device rotates.

2. The compressor of claim 1, wherein the screw thread device includes a threaded engagement between a member disposed stationary relative to the one or more shroud segments, and a member disposed movable relative to the one or more rotor assemblies.

3. The compressor of claim 1, wherein the screw thread device comprises a ball screw assembly.

4. The compressor of claim 3, wherein the ball screw assembly includes a rotatable first member, and a second member attached to the one or more rotor assemblies.

5. The compressor of claim 1, wherein the compressor comprises a plurality of rotor assemblies connected to one another, and the actuator is selectively operable to axially move the plurality of rotor assemblies relative to the one or more shroud segments.

6. The compressor of claim 5, wherein the compressor includes a low-pressure compressor and a high-pressure compressor, and wherein the actuator is selectively operable to axially move a plurality of rotor assemblies relative to one or more shroud segments, within the high pressure compressor.

7. The compressor of claim 5, wherein the compressor includes a low-pressure compressor and a high-pressure compressor, and wherein the actuator is selectively operable to axially move a plurality of rotor assemblies relative to one or more shroud segments, within the low-pressure compressor.

8. The compressor of claim 1, further comprising one or more sensors for sensing the clearance distance.

9. The compressor of claim 1, further comprising one or more knife-edge seals, each seal having a knife-edge portion and the abradable pad, wherein each abradable pad includes a preformed channel that provides different seal gaps at different relative axial positions of the knife edge portion and the abradable pad.

10. A gas turbine engine compressor, comprising:
one or more rotor assemblies, each rotor assembly having a plurality of blades with each blade having a blade tip;
a shroud having one or more blade seal surfaces disposed radially outside of the one or more rotor assemblies;
wherein the blade tips in each of the one or more rotor assemblies has a mating conical geometry with at least one of the one or more blade seal surfaces, and a clearance distance extending between the blade tips and blade seal surfaces; and
an actuator selectively operable to axially move the one or more rotor assemblies relative to the shroud to alter the clearance distance,
wherein the actuator includes a screw thread device, wherein the screw thread device is disposed in connection with the one or more rotor assemblies, wherein the rotor assemblies move axially relative to the other of the shroud segments and rotor assemblies when at least a portion of the screw thread device rotates.

11. The compressor of claim 10, wherein the screw thread device includes a threaded engagement between a member disposed stationary relative to the one or more shroud segments, and a member disposed movable relative to the one or more rotor assemblies.

12. The compressor of claim 10, wherein the screw thread device comprises a ball screw assembly.

13. The compressor of claim 12, wherein the ball screw assembly includes a rotatable first member, and a second member attached to the one or more rotor assemblies.

14. A gas turbine engine compressor, comprising:
one or more rotor assemblies, each rotor assembly having a plurality of blades with each blade having a blade tip;
a shroud having one or more blade seal surfaces disposed radially outside of the one or more rotor assemblies;
wherein the blade tips in each of the one or more rotor assemblies has a mating conical geometry with at least one of the one or more blade seal surfaces, and a clearance distance extending between the blade tips and blade seal surfaces; and
means for selectively axially moving the one or more rotor assemblies relative to the shroud to alter the clearance distance,
wherein the actuator includes a screw thread device, wherein the screw thread device is disposed in connection with the one or more rotor assemblies, wherein the rotor assemblies move axially relative to the other of the shroud segments and rotor assemblies when at least a portion of the screw thread device rotates.

15. A gas turbine compressor, comprising:
a rotor assembly having a plurality of blades with each blade having a blade tip;
a stator assembly disposed adjacent the rotor assembly;
a knife-edge seal having a knife-edge portion attached to the rotor assembly and an abradable pad attached to the stator assembly, wherein the abradable pad includes a preformed channel that provides different seal gaps at different relative axial positions of the knife-edge portion and the abradable pad; and
an actuator selectively operable to axially move the rotor assembly relative to the stator assembly to alter the seal gap,
wherein the actuator includes a screw thread device disposed in connection with the rotor assembly,
wherein the rotor assembly moves axially relative to the stator assembly when at least a portion of the screw thread device rotates.

16. A method for controlling blade tip clearance within a gas turbine compressor, comprising the steps of:
providing a compressor having one or more rotor assemblies, each rotor assembly having a plurality of blades with each blade having a blade tip, and a shroud having one or more blade seal surfaces disposed radially outside of the one or more rotor assemblies, wherein the blade tips in each of the one or more rotor assemblies has a mating conical geometry with at least one of the one or more blade seal surfaces, and a clearance distance extending between the blade tips and blade seal surfaces;
providing an actuator selectively operable to axially move the one or more rotor assemblies relative to the shroud, the actuator includes a screw thread device disposed in connection with the one or more rotor assemblies; and
axially moving the one or more rotor assemblies relative to the shroud using the screw thread device to alter the clearance distance.

17. The method of claim 16, further comprising the steps of:
providing a desired clearance distance extending between the blade tips and blade seal surfaces for a given set of operating conditions;
sensing an actual clearance distance extending between the blade tips and blade seal surfaces;
comparing the desired clearance distance to the sensed actual clearance distance to determine a difference value; and
axially moving the one or more rotor assemblies relative to the shroud using the actuator in a direction that decreases the difference value.

18. A method for controlling knife-edge seal gap within a gas turbine engine, comprising the steps of:
providing at least one rotor assembly having a plurality of blades with each blade having a blade tip, and stator assembly disposed adjacent the at least one rotor assembly;
providing at least one knife-edge seal having a knife-edge portion attached to the at least one rotor assembly and an abradable pad attached to the stator assembly, wherein each abradable pad includes a preformed channel that provides different seal gaps at different relative axial positions of the knife edge portion and the abradable pad;
providing an actuator selectively operable to axially move the at least one rotor assembly relative to the stator assembly, the actuator includes a screw thread device disposed in connection with the at least one rotor assembly; and
axially moving the at least one rotor assembly relative to the stator assembly using the screw thread device to alter the seal gap.

19. A gas turbine engine, comprising:
one or more rotor assemblies, each rotor assembly having a plurality of blades with each blade having a blade tip;
one or more shroud segments having blade seal surfaces disposed radially outside of the one or more rotor assemblies;
wherein the blade tips and blade seal surfaces have mating conical geometries and a clearance distance extending between the blade tips and blade seal surfaces; and
an actuator selectively operable to axially move one or both of the shroud segments and rotor assemblies relative to the other of the shroud segments and rotor assemblies to alter the clearance distance,
wherein the actuator includes a screw thread device disposed in connection with the rotor assembly,
wherein the rotor assembly moves axially relative to the stator assembly when at least a portion of the screw thread device rotates.

* * * * *